United States Patent [19]

Inoue

[11] Patent Number: 5,003,684
[45] Date of Patent: Apr. 2, 1991

[54] METHOD OF MANUFACTURING TUBULAR VIBRATION-INSULATING BUSHING

[75] Inventor: Masaki Inoue, Aichi, Japan

[73] Assignee: Toyoda Gosei Co., Ltd., Nishikasugai, Japan

[21] Appl. No.: 413,239

[22] Filed: Sep. 27, 1989

[30] Foreign Application Priority Data

Nov. 29, 1988 [JP] Japan .................. 63-301318

[51] Int. Cl.$^5$ .......................................... B23P 11/02
[52] U.S. Cl. .......................................... 29/447; 29/451; 29/525; 29/527.1
[58] Field of Search ............. 29/446, 505, 508, 525, 29/527.1, 577.3, 530, 451, 447

[56] References Cited

U.S. PATENT DOCUMENTS

| | | | |
|---|---|---|---|
| 4,732,492 | 3/1988 | Bonfils | 29/446 X |
| 4,750,747 | 6/1988 | Holzer | 29/446 X |
| 4,846,911 | 7/1989 | Tackett et al. | 29/446 X |

*Primary Examiner*—Timothy V. Eley
*Attorney, Agent, or Firm*—Cushman, Darby & Cushman

[57] ABSTRACT

A method of manufacturing a tubular vibration-insulating bushing including a cylindrical outer tube; a vibration-insulating rubber member disposed within the outer tube, and extending lengthwise along the outer tube, and extending widthwise transversely of the inner tube in such a manner that opposite lateral sides of the rubber member are connected to an inner peripheral surface of the outer tube; and an inner tube embedded in and extending through a central portion of the rubber member in coaxial relation to the outer tube is provided. The method includes the steps of: forming the outer tube from a resilient material; placing the outer tube in a mold in such a manner that the outer tube is resiliently deformed into an oval cross-section; pouring a molding material into the outer tube of an oval cross-section to mold the vibration-insulating rubber member so as to provide the bushing, the rubber member extending widthwise along the greatest diameter of the outer tube of an oval cross-section; subsequently removing the bushing from the mold; and subsequently press-fitting the outer tube into a cross-sectionally circular bore of a holder bracket while deforming the outer tube into a circular cross-section, thereby fixing the outer tube relative to the bracket.

6 Claims, 2 Drawing Sheets

METHOD OF MANUFACTURING TUBULAR VIBRATION-INSULATING BUSHING

BACKGROUND OF THE INVENTION

1. Field of the Invention

This invention relates to a method of manufacturing a tubular vibration-insulating bushing, and more particularly to such a method which obviates the need for a drawing step which requires large-scale facilities, thereby greatly reducing the manufacturing cost.

2. Description of the Related Art

A conventional vibration-insulating bushing of the type under consideration comprises an inner tube, an outer tube mounted around the inner tube and coaxially therewith, and a vibration-insulating rubber member formed between and integrally joined to the inner and outer tubes. Such a bushing has been extensively used as an engine-mounting member and a suspension bushing.

In accordance with the general method of manufacturing such a vibration-insulating bushing, the inner and outer tubes are placed in a mold, and a rubber material is poured into the space between the inner and outer tubes so as to mold a vibration-insulating rubber member which is integrally joined to the inner and outer tubes through vulcanization. When the vibration-insulating rubber member is molded, a tensile stress develops in the rubber member because of thermal shrinkage. This decreases the durability of the rubber member. For that reason, conventionally, the outer tube has been drawn into a smaller diameter after the molding of the vibration-insulating rubber member, so as to eliminate the above-mentioned tensile stress and also to apply a slight compression to the bushing.

The term "pouring" as used above means to supply the molding material into a closed space within the mold from outside the mold, and should be broadly construed and includes "injection".

The vibration-insulating bushing thus manufactured is press-fitted into and fixed to the cross-sectionally circular bore of a holder bracket.

In one example of such vibration-insulating bushings, the vibration-insulating rubber member is disposed within the outer tube to extend widthwise transversely of the outer tube so as to reduce the spring constant in one direction perpendicular to the axis of the bushing, and the inner tube is embedded in and extends through the central portion of the rubber member.

Usually, the outer tube is made of steel, and the drawing rate needs be about 5 to 10% (About 2% is the shrinkage strain of the vibration-insulating rubber member). Therefore, drawing equipment is relatively large, and considerable cost and time are required. Further, with respect to the press-fitting of the outer tube, the amount or rate of pressing must be accurately determined. Otherwise, the outer tube would be subjected to strain, or the fixing force would be inadequate. To avoid these problems, it has been necessary to carefully determine and carry out press-fitting with a great deal of labor and time.

SUMMARY OF THE INVENTION

It is therefore an object of this invention to provide a method of manufacturing a tubular vibration-insulating bushing having a reduced spring constant in a direction perpendicular to the axis of the bushing, in which there is no need for a drawing step, the press-fitting of the bushing can be carried out easily and positively, and the method can be performed at low cost.

According to the present invention, a method of manufacturing a tubular vibration-insulating bushing is provided. The vibration-insulating bushing includes a cylindrical outer tube; a vibration-insulating rubber member disposed within said outer tube, extending lengthwise along the outer tube, and extending widthwise transversely of the outer tube in such a manner that opposite lateral sides of the rubber member are connected to an inner peripheral surface of the outer tube; and an inner tube embedded in and extending through a central portion of said rubber member in coaxial relation to the outer tube. The method includes the steps of:

forming the outer tube from a resilient material;

placing the outer tube in a mold in such a manner that the outer tube is resiliently deformed into an oval cross-section;

pouring a molding material into the outer tube to mold the vibration-insulating rubber member so as to provide the bushing, the rubber member extending widthwise along the greatest diameter of said outer tube;

subsequently removing the bushing from the mold; and press-fitting the outer tube into a cross-sectionally circular bore of a holder bracket while deforming the outer tube into a circular cross-section, thereby fixing the outer tube relative to the bracket.

In the bushing manufacturing method of the present invention, the molding material is poured into an outer tube, which has been deformed into an oval cross-section, to thereby mold the vibration-insulating rubber member. The thus molded rubber member is subjected to thermal shrinkage. Upon removal of the bushing from the mold, because of the thermal shrinkage of the vibration-insulating rubber member and the resilient restoring force of the outer tube, the outer tube is restored into an oval cross-section having its greatest diameter smaller than that of the previous oval cross-section thereof, thereby preventing the development of a tensile stress in the vibration-insulating rubber member.

In this condition, the outer tube is pressed fitted into the cross-sectionally circular bore of the holder bracket while compressing the outer tube from thereof opposite sides thereof along the greatest diameter of the oval-shaped outer tube to return the outer tube into a circular cross-section. As a result, the outer periphery of the outer tube is pressed against the inner surface of the cross-sectionally circular bore so that the outer tube is positively retained in this bore.

At this time, since the stress in the vibration-insulating rubber member is converted to a stress in the direction of the compression, the durability of the rubber member is enhanced.

DESCRIPTION OF THE PREFERRED EMBODIMENT OF THE INVENTION

The invention will now be described with reference to the drawings.

Figure 1:
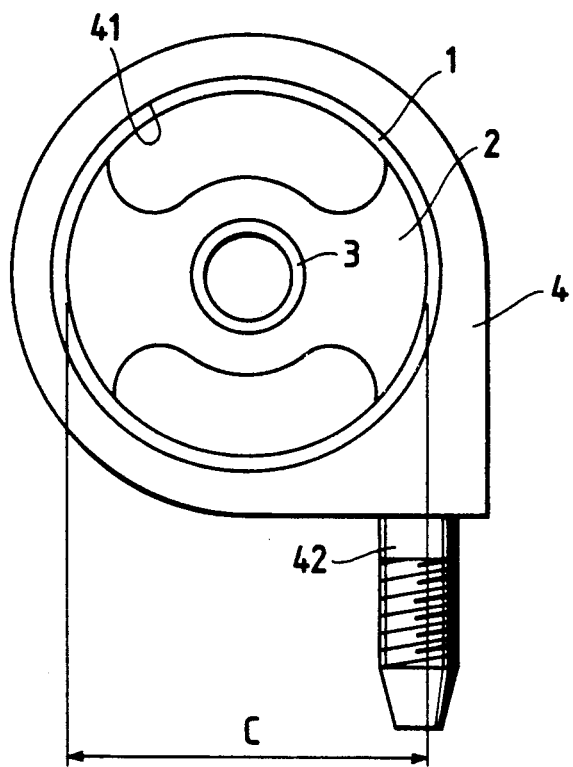
FIG. 1 is a front-elevational view of a vibration-insulating bushing manufactured by a method according to the present invention.

FIG. 1 shows a tubular vibration-insulating bushing manufactured by a method of the present invention. The vibration-insulating bushing comprises an outer cylindrical tube 1 press-fitted into and fixed relative to a cross-sectionally circular bore 41 of a holder bracket 4. A vibration-insulating rubber member 2 is disposed within the outer tube 1, and extends lengthwise along the outer tube 1, and also horizontally extends widthwise transversely of the outer tube 1. The opposite lateral sides of the vibration-insulating rubber member 2 are integrally joined to the inner peripheral surface of the outer tube 1. An inner tube 3 is embedded in and extends through the central portion of the rubber member 2 in concentric relation to the outer tube 1.

The holder bracket 4 is fixedly mounted, for example, on an engine of a vehicle by a mounting bolt 42 formed on and extending from the bracket 4, and by a connecting bolt passed through the inner tube 3 and fixed to a frame of the vehicle. With this construction, the vibration-insulating bushing exhibits a sufficiently small spring constant when it is subjected to vibrations in upward and downward directions (FIG. 1), thus achieving a good vibration absorbing effect.

Figure 2:
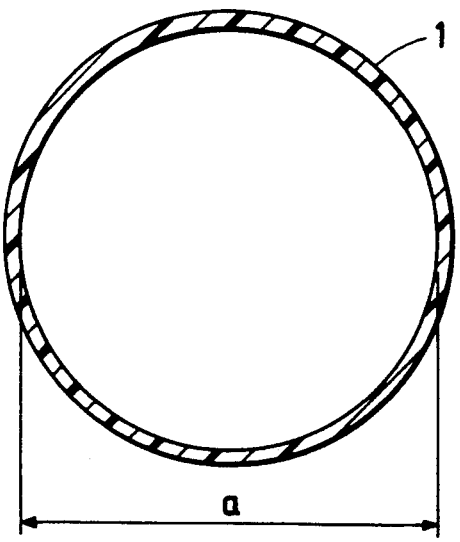
FIG. 2 a cross-sectional view of an outer tube of the bushing.
Figure 3:
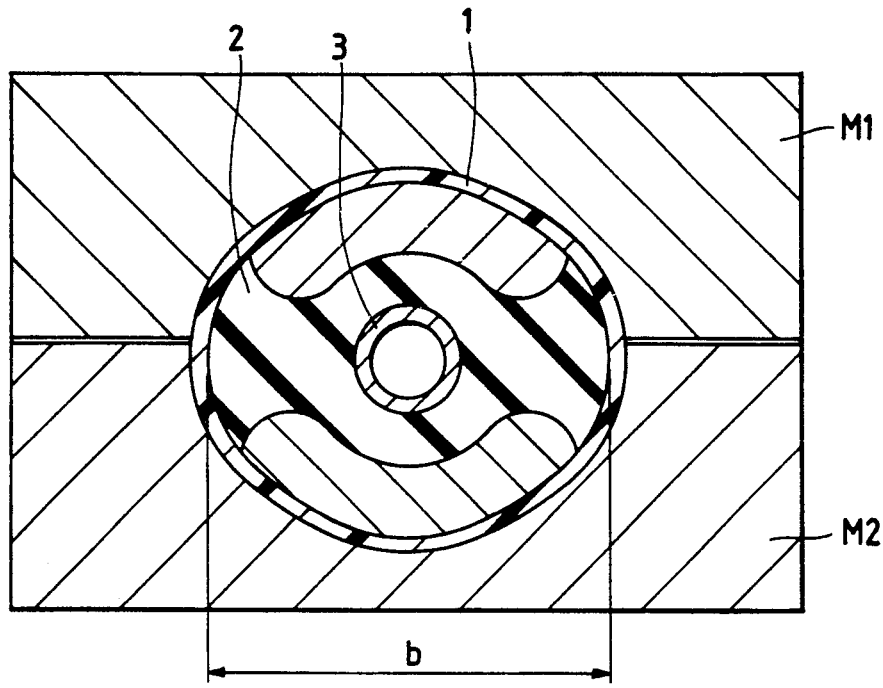
FIG. 3 is a cross-sectional view showing the molding of a vibration-insulating rubber member.

The above vibration-insulating bushing is manufactured according to the following procedure:

The outer tube 1 is made of a resilient resin material such as nylon, and its inner diameter a is circular (see FIG. 2). The outer tube 1 is placed or set in a pair of molds M1 and M2 in such a manner that the transverse cross-section of the outer tube 1 is deformed into an oval shape of the greatest diameter is indicated by reference character b. In this condition, the inner tube 3 is positioned at the center of the outer tube 1, and a rubber material is poured into the outer tube 1 along the median plane of the outer tube 1 in which the greatest diameter of the outer tube 1 lies, and is vulcanized to mold the vibration-insulating rubber member 2. At this time, a tensile stress develops in the vibration-insulating rubber member 2 because of thermal shrinkage.

Figure 4:
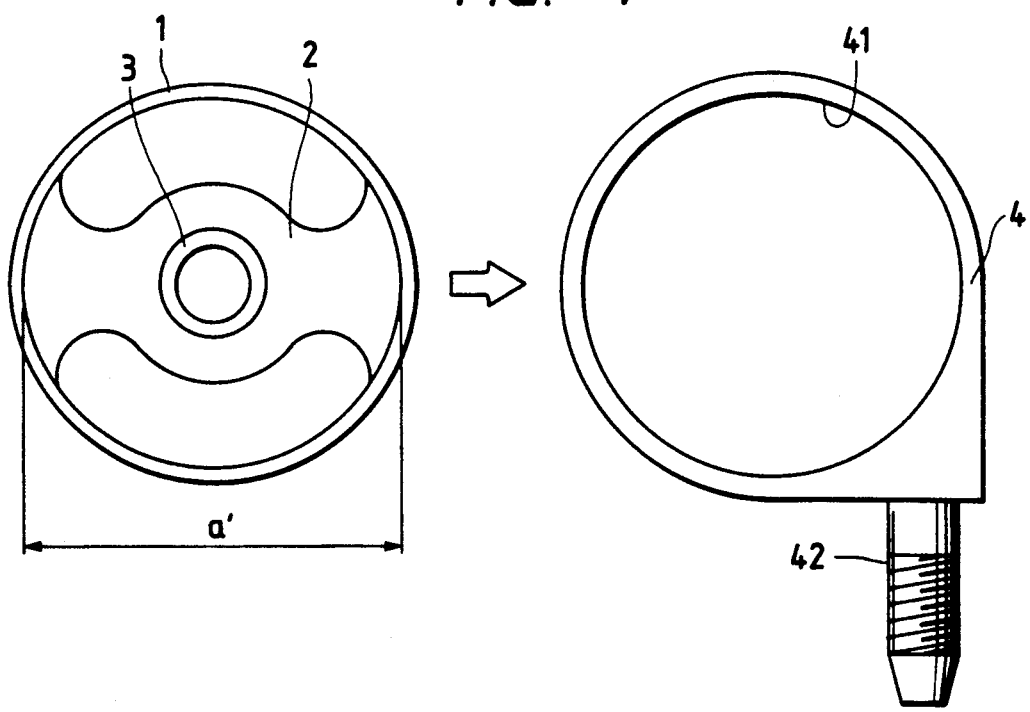
FIG. 4 is a front-elevational view showing the bushing to be press-fitted into a holder bracket.

When the thus produced bushing is removed from the molds M1 and M2, because of the resilient restoring force of the outer tube 1 and the shrinkage of the vibration-insulating rubber member 2, the outer tube 1 is changed into an oval cross-section (see FIG. 4) which is closer to a circular cross-section and has the greatest diameter a' shorter than the aforesaid greatest diameter b. As a result, the tensile stress in the vibration-insulating rubber member 2 is eliminated.

Then, the outer tube 1, which has a greatest diameter a' is compressed from the opposite sides thereof to return the cross-section thereof to a circular shape. Then, the bushing is press-fitted into and is retained in the cross-sectionally circular bore 41 of the holder bracket 4, so that the outer tube 1 is further changed into a smaller circular cross-section c (FIG. 1).

Thus, the width b of the vibration-insulating rubber member 2 is reduced into a width c. If this reduction rate is predetermined to be 5 to 10%, the tensile stress in the vibration-insulating rubber member 2 is converted to a compression stress, thereby enhancing its durability. Further, since the outer tube 1 press-fitted into the bore 41 of a circular cross-section is subjected to an expansion restoring force of the vibration-insulating rubber member 2, the outer periphery of the outer tube 1 is pressed against the inner surface of the bore 41, so that the outer tube 1 is positively fixed relative to the bore 41.

The material from which the outer tube 1 is made is not restricted to a resin material, and the outer tube 1 can be made of a thin sheet of metal.

As described abOve, according to the bushing manufacturing method of the present invention, a drawing step is not required, and therefore the manufacturing costs can be greatly reduced.

Also, the press-fitting of the outer tube 1 into the cross-sectionally circular bore 41 of the holder bracket 4 can be easily effected. Further, the outer tube 1 can be positively and firmly retained in the bore 41 because of the elastic nature of the vibration-insulating rubber member 2.

What is claimed is:

1. A method of manufacturing a tubular vibration-insulating bushing including a cylindrical outer tube; a vibration-insulating rubber member disposed within said outer tube, extending lengthwise along said outer tube, and extending widthwise transversely of said outer tube in such a manner that opposite lateral sides of said rubber member are connected to an inner peripheral surface of said outer tube; and an inner tube embedded in and extending through a central portion of said rubber member in coaxial relation to said outer tube; and mounting the same to a holder bracket, said member comprising the steps of:

forming an outer tube from a resilient material;

placing said outer tube in a mold in such a manner that said outer tube is resiliently deformed into an oval cross-section;

pouring a molding material into said outer tube to mold a vibration-insulating rubber member so as to form the bushing, said rubber member extending widthwise along the greatest diameter of said outer tube;

subsequently removing the bushing from said mold; and subsequently press-fitting said outer tube into a cross-sectionally circular bore of a holder bracket while deforming said outer tube into a circular cross-section, thereby fixing said outer tube relative to said bracket.

2. A method of manufacturing a tubular vibration-insulating bushing according to the claim 1, in which a greatest diameter b of the outer tube of oval cross-section following said placing step is larger than a greatest diameter a' of the outer tube following said removing step.

3. A method of manufacturing a tubular vibration-insulating bushing according to the claim 1, in which a greatest diameter a' of the outer tube following said pouring step is larger than a diameter c of the outer tube following said press-fitting step.

4. A method of manufacturing a tubular vibration-insulating bushing according to claim 1, in which a greatest diameter b of the outer tube following said placing step is reduced to a diameter c during said press-fitting step in such a manner that the reduction rate is between about 5% and about 10%.

5. A method of manufacturing a tubular vibration-insulating bushing according to the claim 1, in which said step of forming an outer tube comprises forming an outer tube from a resin material.

6. A method of manufacturing a tubular vibration-insulating bushing according to the claim 1, in which step of forming an outer tub comprises forming an outer tube from a thin sheet of metal.

* * * * *